(12) United States Patent
Pirogov et al.

(10) Patent No.: US 8,681,122 B2
(45) Date of Patent: Mar. 25, 2014

(54) CAPACITIVE SENSING WITH PROGRAMMABLE LOGIC FOR TOUCH SENSE ARRAYS

(75) Inventors: Oleksandr Pirogov, Lviv (UA); Roman Ogirko, Lviv (UA); Andriy Yarosh, Moguliv-Podilskiy (UA); Viktor Kremin, Lviv (UA); Roman Sharamaga, Lviv (UA); Anton Konovalov, Khmelnitsky (UA); Andriy Maharyta, Lviv (UA); Haneef Mohammed, Beaverton, OR (US)

(73) Assignee: Cypress Semiconductor Corporation, San Jose, CA (US)

(*) Notice: Subject to any disclaimer, the term of this patent is extended or adjusted under 35 U.S.C. 154(b) by 222 days.

(21) Appl. No.: 13/247,331

(22) Filed: Sep. 28, 2011

(65) Prior Publication Data
US 2012/0268416 A1    Oct. 25, 2012

Related U.S. Application Data

(60) Provisional application No. 61/477,144, filed on Apr. 19, 2011.

(51) Int. Cl.
G06F 3/044    (2006.01)

(52) U.S. Cl.
USPC ........... 345/174; 345/156; 178/18.06; 326/38

(58) Field of Classification Search
USPC ............... 345/156, 173, 174, 179; 178/18.06, 178/19.03; 326/38, 41, 47; 710/18, 266
See application file for complete search history.

(56) References Cited

U.S. PATENT DOCUMENTS

| | | | |
|---|---|---|---|
| 7,737,724 B2 | 6/2010 | Snyder et al. | |
| 8,040,142 B1 * | 10/2011 | Bokma et al. | 324/658 |
| 8,135,884 B1 * | 3/2012 | Sullam et al. | 710/48 |
| 8,154,310 B1 * | 4/2012 | Maharyta et al. | 324/686 |
| 8,212,159 B2 * | 7/2012 | Stewart | 178/18.06 |
| 2007/0229470 A1 * | 10/2007 | Snyder et al. | 345/173 |
| 2007/0273560 A1 * | 11/2007 | Hua et al. | 341/33 |
| 2008/0111714 A1 * | 5/2008 | Kremin | 341/33 |
| 2008/0150905 A1 * | 6/2008 | Grivna et al. | 345/173 |
| 2008/0150906 A1 * | 6/2008 | Grivna | 345/173 |
| 2008/0179112 A1 * | 7/2008 | Qin et al. | 178/18.06 |
| 2008/0246723 A1 * | 10/2008 | Baumbach | 345/156 |
| 2008/0258759 A1 * | 10/2008 | Snyder et al. | 326/38 |
| 2008/0258760 A1 * | 10/2008 | Sullam et al. | 326/38 |
| 2008/0277171 A1 * | 11/2008 | Wright | 178/18.06 |
| 2009/0058829 A1 * | 3/2009 | Kim et al. | 345/173 |
| 2009/0265670 A1 * | 10/2009 | Kim et al. | 715/863 |
| 2010/0149126 A1 * | 6/2010 | Futter | 345/174 |
| 2010/0245286 A1 | 9/2010 | Parker | |
| 2011/0018829 A1 | 1/2011 | Peng | |
| 2011/0147101 A1 * | 6/2011 | Bateman et al. | 178/18.06 |
| 2013/0027346 A1 * | 1/2013 | Yarosh et al. | 345/174 |

OTHER PUBLICATIONS

International Search Report for International Application No. PCT/US11/67140 dated Apr. 19, 2012; 2 pages.
Written Opinion of the International Searching Authority for International Application No. PCT/US11/67140 mailed Apr. 19, 2012; 4 pages.

* cited by examiner

*Primary Examiner* — Joe H Cheng

(57) ABSTRACT

A touch sense controller configured to be coupled to a touch sense array is disclosed. The touch sense controller includes programmable logic that includes programmable logic elements configured to manage measurement of capacitance associated with the touch sense array.

15 Claims, 13 Drawing Sheets

```
1.   Start                                      //SOS—start of scan
2.   For(slot RX = 1; #slot RX)                 //start RX slots loop
3.   {
4.       Load TX sequence;                      //initialize MPTX sequence;
5.                                              //load from CtrlReg to ShiftReg
6.                                              //followed by XOR and modulated by Comm TX
7.       Config RX mux;                         //enable i-th RX slot
8.       If(slot RX == #slot RX) set Last RX slot enable  //Last RX slot may
9.                                              //consist of < 4 channels
10.                                             //this will disable unused channels
11.      For (seq TX = 1; #seq TX)              //start TX seq shift loop
12.      {
13.          Configure TX pins;                 //shift TX sequence starting from second iteration
14.          Reset CDC;                         //reset Capacitance-to-Digital convertor
15.          Set Comm TX clk = 1;               //initial Comm TX state
16.                                             //oscillators are stopped
17.
18.          Start conversion;                  //release CDC from reset
19.          Set Comm TX clk = 0;               //release oscillators
20.
21.          Do first clock ("skip first");     //for proper CDC operation
22.                                             //disable A2D integration
23.                                             //for the first TX cycle
24.
25.          For (Comm Tx clk = 1; # Comm Tx clk) {A2D Digital Integration;}
26.
27.          Scan complete;
28.          Move A2D result from timer Count to Capture Reg (TC Reg);
29.
30.          Generate CDC ISR: DMA TC Reg -> TMP RAM (high priority)
31.          Decrement seq TX (Continue);
32.      }    //end TX seq shift loop
33.
34.      Decrement slot RX (Continue)
35.  }   //end RX slots loop
36.  Generate EOS ISR
37.  End                                        //EOS-end of scan
38.  //CPU waits for data processing complete of previous scan
39.  //then requests transfer DMA TMP RAM -> Final RAM
```

FIGURE 7A

CAPACITIVE SENSING WITH PROGRAMMABLE LOGIC FOR TOUCH SENSE ARRAYS

RELATED APPLICATIONS

This application claims the benefit of Provisional Application No. 61/477,144, filed on Apr. 19, 2011, the entire contents of which are hereby incorporated by reference.

TECHNICAL FIELD

The present invention relates generally to capacitive touch sense arrays, and more particularly, to a programmable sequencer based on programmable logic for touch sense arrays.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of one or more conductive objects, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

Another user interface device that has become more common is a touch screen. Touch screens, also known as touch-screens, touch windows, touch panels, or touchscreen panels, are transparent display overlays which are typically either pressure-sensitive (resistive or piezoelectric), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. Touch screens have become familiar in retail settings, on point-of-sale systems, on ATMs, on mobile handsets, on kiosks, on game consoles, and on PDAs where a stylus is sometimes used to manipulate the graphical user interface (GUI) and to enter data. A user can touch a touch screen or a touch-sensor pad to manipulate data. For example, a user can apply a single touch, by using a finger to touch the surface of a touch screen, to select an item from a menu.

A certain class of touch sense arrays includes a two-dimensional array of capacitors, referred to as sense elements. Touch sense arrays can be scanned in several ways, one of which (mutual-capacitance sensing) permits individual capacitive elements to be measured. Another method (self-capacitance sensing) can measure an entire sensor strip, or even an entire sensor array, with less information about a specific location, but performed with a single read operation.

The two-dimensional array of capacitors, when placed in close proximity, provides a means for sensing touch. A conductive object, such as a finger or a stylus, coming in close proximity to the touch sense array causes changes in the capacitances of the sense elements in proximity to the conductive object. More particularly, when a finger touch occurs, self-capacitance increases whereas mutual capacitance decreases. These changes in capacitance can be measured to produce a "two-dimensional map" that indicates where the touch on the array has occurred.

One way to measure such capacitance changes is to form a circuit comprising a signal driver (e.g., an AC current or a voltage source) which is applied to each horizontally aligned conductor in a multiplexed fashion. The charge associated with each of the capacitive intersections is sensed and similarly scanned at each of the vertically aligned electrodes in synchronization with the applied current/voltage source. This charge is then measured using a touch sense controller that typically includes a form of charge-to-voltage converter, followed by a multiplexer and A/D converter that is interfaced with a central processing unit (CPU) to convert the input signal to digital form. The CPU, in turn, renders the "two-dimensional map" or "touch map" and determines the location of a touch. A full scan of a panel of pairs of electrodes (i.e., slots) is performed before the resulting data is processed by the CPU in a serial fashion. Unfortunately, such "serial" scanning is too slow for modern touch screen devices.

An alternative approach is to perform capacitance-to-code conversion (scanning) using dedicated blocks of digital logic (i.e., a HW scanning engine) and the converted data is processed by a CPU. Unfortunately, such a hardware-based scanning engine is implemented in synthesized digital logic blocks with fixed implementation (i.e., having non-programmable elements). As a result, the hardware-based scanning engine operates according to algorithms defined at design time of the integrated circuit (IC). Advanced features such as adaptive scanning algorithms that require special timing, additional control signals, and/or extra measurement cycles require redesign of the integrated circuit (IC) on which hardware-based scanning engine is fabricated.

Further, high conversion speeds may not be attainable because CPU processing is frequently interrupted by the hardware-based scanning engine when RX and TX multiplexers have to be reconfigured between conversions. This reduces data reporting rates.

BRIEF DESCRIPTION OF THE DRAWINGS

Embodiments of the present invention will be more readily understood from the detailed description of exemplary embodiments presented below considered in conjunction with the attached drawings in which like reference numerals refer to similar elements and in which:

FIG. 7A shows a pseudo-code listing that describes the sequence of operations performed by the programmable sequencer of FIG. 5.

DETAILED DESCRIPTION

A touch sense controller configured to be coupled to a touch sense array is disclosed. The touch sense controller includes programmable logic that includes programmable logic elements configured to manage measurement of capacitance associated with the touch sense array. The programmable logic elements may be constructed of universal digital logic blocks (UDB) of the touch sense controller.

In an embodiment, the programmable logic may be configured as a programmable sequencer that is a hardware-controlled scanning thread to scan the touch sense array without interaction of a processing core of the touch sense controller.

In an embodiment, the programmable sequencer may include a run-time reconfigurable state machine.

In an embodiment, the programmable logic may be configured to apply TX signals on TX pins and receive RX signals on RX pins without interaction of the CPU.

In an embodiment, the programmable logic may be reconfigurable during system boot time according to properties of the touch sense array and may be configured to perform an adaptive scanning algorithm.

In an embodiment, one of the programmable logic elements includes an RX slots control sequencer block configured to selectively enable/disable RX measurement channels to take part in a conversion. One of the programmable logic elements may also include a TX pins control sequencer block configured to apply TX excitation signals to TX pins. Another of the programmable logic elements may be configured to provide control of a capacitance-to-code conversion circuit.

Possible advantages of employing the above programmable logic include providing a flexible architecture as building blocks of a touch sense controller. The programmable sequencer is based on programmable logic in the form of chained UDBs. This permits changes in scanning sequences (i.e., adaptive scanning algorithms) by reprogramming parts without silicon redesign.

A fully hardware controlled scanning thread is provided. As a result, a processing core is interrupted by the programmable sequencer only after scanning of an entire panel. This improves execution speed by improving the rate of generation of a touch map, since the processing core does not need to reconfigure pins from conversion to conversion.

The programmable sequencer, together with a processing core and such processing accelerators as a digital filter block (DFB) and multiple DMA channels, permits the construction of an effective multi-channel mutual capacitive sensing solution for all point addressable touch sense controllers.

Figure 1:
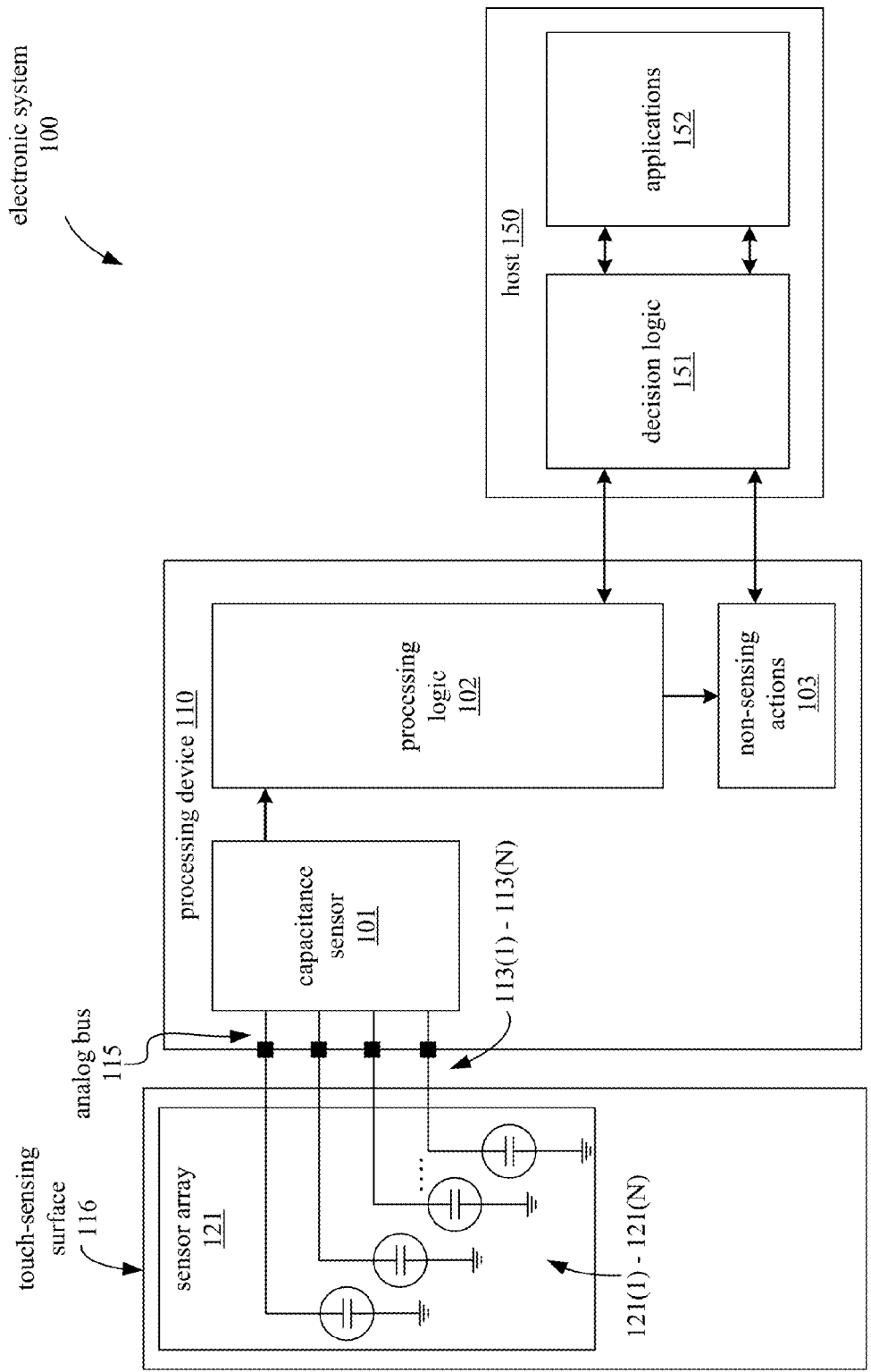
FIG. 1 illustrates a block diagram of one embodiment of an electronic system including a processing device that may be configured to measure capacitances from a flexible touch-sensing surface and calculate or detect the amount of force applied to the flexible touch-sensing surface.

FIG. 1 illustrates a block diagram of one embodiment of an electronic system 100 including a processing device 110 that may be configured to measure capacitances from a flexible touch-sensing surface and calculate or detect the amount of force applied to the flexible touch-sensing surface. The electronic system 100 includes a touch-sensing surface 116 (e.g., a touch screen, or a touch pad) coupled to the processing device 110 and a host 150. In one embodiment, the touch-sensing surface 116 is a two-dimensional user interface that uses a sensor array 121 to detect touches on the surface 116.

In one embodiment, the sensor array 121 includes sensor elements 121(1)-121(N) (where N is a positive integer) that are disposed as a two-dimensional matrix (also referred to as an XY matrix). The sensor array 121 is coupled to pins 113(1)-113(N) of the processing device 110 via one or more analog buses 115 transporting multiple signals. In this embodiment, each sensor element 121(1)-121(N) is represented as a capacitor. The self capacitance of each sensor in the sensor array 121 is measured by a capacitance sensor 101 in the processing device 110.

In one embodiment, the capacitance sensor 101 may include a relaxation oscillator or other means to convert a capacitance into a measured value. The capacitance sensor 101 may also include a counter or timer to measure the oscillator output. The capacitance sensor 101 may further include software components to convert the count value (e.g., capacitance value) into a sensor element detection decision (also referred to as switch detection decision) or relative magnitude. It should be noted that there are various known methods for measuring capacitance, such as current versus voltage phase shift measurement, resistor-capacitor charge timing, capacitive bridge divider, charge transfer, successive approximation, sigma-delta modulators, charge-accumulation circuits, field effect, mutual capacitance, frequency shift, or other capacitance measurement algorithms. It should be noted however, instead of evaluating the raw counts relative to a threshold, the capacitance sensor 101 may be evaluating other measurements to determine the user interaction. For example, in the capacitance sensor 101 having a sigma-delta modulator, the capacitance sensor 101 is evaluating the ratio of pulse widths of the output, instead of the raw counts being over or under a certain threshold.

In one embodiment, the processing device 110 further includes processing logic 102. Operations of the processing logic 102 may be implemented in firmware; alternatively, it may be implemented in hardware or software. The processing logic 102 may receive signals from the capacitance sensor 101, and determine the state of the sensor array 121, such as whether an object (e.g., a finger) is detected on or in proximity to the sensor array 121 (e.g., determining the presence of the object), where the object is detected on the sensor array (e.g., determining the location of the object), tracking the motion of the object, or other information related to an object detected at the touch sensor.

In another embodiment, instead of performing the operations of the processing logic 102 in the processing device 110, the processing device 110 may send the raw data or partially-processed data to the host 150. The host 150, as illustrated in FIG. 1, may include decision logic 151 that performs some or all of the operations of the processing logic 102. Operations of the decision logic 151 may be implemented in firmware, hardware, software, or a combination thereof. The host 150 may include a high-level Application Programming Interface (API) in applications 152 that perform routines on the received data, such as compensating for sensitivity differences, other compensation algorithms, baseline update routines, start-up and/or initialization routines, interpolation operations, or scaling operations. The operations described with respect to the processing logic 102 may be implemented in the decision logic 151, the applications 152, or in other hardware, software, and/or firmware external to the processing device 110. In some other embodiments, the processing device 110 is the host 150.

In another embodiment, the processing device 110 may also include a non-sensing actions block 103. This block 103 may be used to process and/or receive/transmit data to and from the host 150. For example, additional components may be implemented to operate with the processing device 110 along with the sensor array 121 (e.g., keyboard, keypad, mouse, trackball, LEDs, displays, or other peripheral devices).

In one embodiment, the electronic system 100 is implemented in a device that includes the touch-sensing surface 116 as the user interface, such as handheld electronics, portable telephones, cellular telephones, notebook computers, personal computers, personal data assistants (PDAs), kiosks, keyboards, televisions, remote controls, monitors, handheld multi-media devices, handheld video players, gaming devices, control panels of a household or industrial appliances, or other computer peripheral or input devices. Alternatively, the electronic system 100 may be used in other types of devices. It should be noted that the components of electronic system 100 may include all the components described above. Alternatively, electronic system 100 may include only some of the components described above, or include additional components not listed herein.

Figure 2:
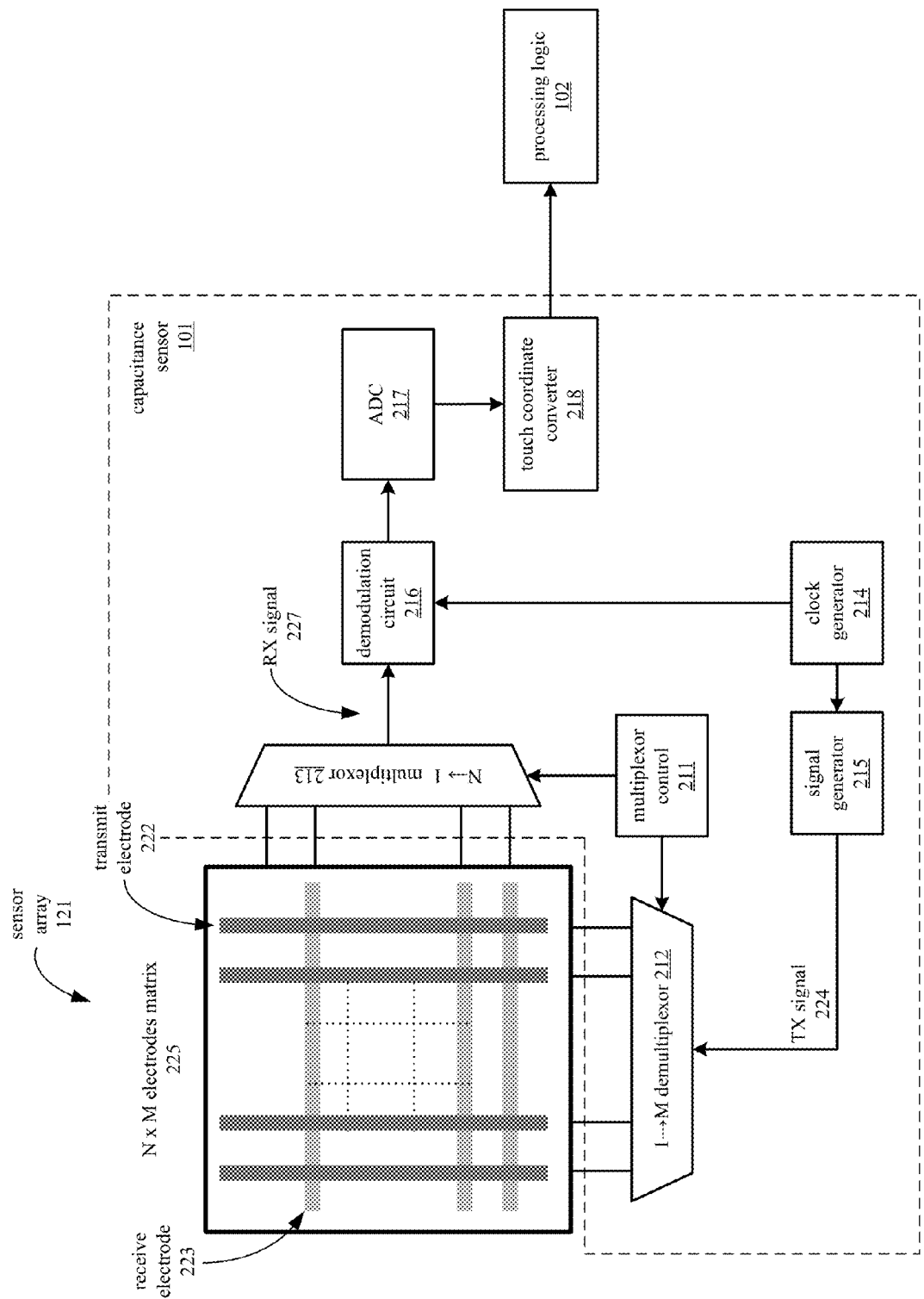
FIG. 2 is a block diagram illustrating one embodiment of a capacitive touch sensor array and a capacitance sensor that converts measured capacitances to coordinates corresponding to FIG. 1.

FIG. 2 is a block diagram illustrating one embodiment of a capacitive touch sensor array 121 and a capacitance sensor 101 that converts measured capacitances to coordinates. The coordinates are calculated based on measured capacitances. In one embodiment, sensor array 121 and capacitance sensor 101 are implemented in a system such as electronic system 100. Sensor array 121 includes a matrix 225 of N×M electrodes (N receive electrodes and M transmit electrodes), which further includes transmit (TX) electrode 222 and receive (RX) electrode 223. Each of the electrodes in matrix 225 is connected with capacitance sensing circuit 201 through demultiplexer 212 and multiplexer 213.

Capacitance sensor 101 includes multiplexer control 211, demultiplexer 212 and multiplexer 213, clock generator 214, signal generator 215, demodulation circuit 216, and analog to digital converter (ADC) 217. ADC 217 is further coupled with touch coordinate converter 218. Touch coordinate converter 218 outputs a signal to the processing logic 102.

The transmit and receive electrodes in the electrode matrix 225 may be arranged so that each of the transmit electrodes overlap and cross each of the receive electrodes such as to form an array of intersections, while maintaining galvanic isolation from each other. Thus, each transmit electrode may be capacitively coupled with each of the receive electrodes. For example, transmit electrode 222 is capacitively coupled with receive electrode 223 at the point where transmit electrode 222 and receive electrode 223 overlap.

Clock generator 214 supplies a clock signal to signal generator 215, which produces a TX signal 224 to be supplied to the transmit electrodes of touch sensor 121. In one embodiment, the signal generator 215 includes a set of switches that operate according to the clock signal from clock generator 214. The switches may generate a TX signal 224 by periodically connecting the output of signal generator 215 to a first voltage and then to a second voltage, wherein said first and second voltages are different.

The output of signal generator 215 is connected with demultiplexer 212, which allows the TX signal 224 to be applied to any of the M transmit electrodes of touch sensor 121. In one embodiment, multiplexer control 211 controls demultiplexer 212 so that the TX signal 224 is applied to each transmit electrode 222 in a controlled sequence. Demultiplexer 212 may also be used to ground, float, or connect an alternate signal to the other transmit electrodes to which the TX signal 224 is not currently being applied.

Because of the capacitive coupling between the transmit and receive electrodes, the TX signal 224 applied to each transmit electrode induces a current within each of the receive electrodes. For instance, when the TX signal 224 is applied to transmit electrode 222 through demultiplexer 212, the TX signal 224 induces an RX signal 227 on the receive electrodes in matrix 225. The RX signal 227 on each of the receive electrodes can then be measured in sequence by using multiplexer 213 to connect each of the N receive electrodes to demodulation circuit 216 in sequence.

The mutual capacitance associated with each intersection between a TX electrode and an RX electrode can be sensed by selecting every available combination of TX electrode and an RX electrode using demultiplexer 212 and multiplexer 213. To improve performance, multiplexer 213 may also be segmented to allow more than one of the receive electrodes in matrix 225 to be routed to additional demodulation circuits 216. In an optimized configuration, wherein there is a 1-to-1 correspondence of instances of demodulation circuit 216 with receive electrodes, multiplexer 213 may not be present in the system.

When an object, such as a finger, approaches the electrode matrix 225, the object causes a decrease in the mutual capacitance between only some of the electrodes. For example, if a finger is placed near the intersection of transmit electrode 222 and receive electrode 223, the presence of the finger will decrease the mutual capacitance between electrodes 222 and 223. Thus, the location of the finger on the touchpad can be determined by identifying the one or more receive electrodes having a decreased mutual capacitance in addition to identifying the transmit electrode to which the TX signal 224 was applied at the time the decreased mutual capacitance was measured on the one or more receive electrodes.

By determining the mutual capacitances associated with each intersection of electrodes in the matrix 225, the locations of one or more touch contacts may be determined. The determination may be sequential, in parallel, or may occur more frequently at commonly used electrodes.

In alternative embodiments, other methods for detecting the presence of a finger or conductive object may be used where the finger or conductive object causes an increase in capacitance at one or more electrodes, which may be arranged in a grid or other pattern. For example, a finger placed near an electrode of a capacitive sensor may introduce an additional capacitance to ground that increases the total capacitance between the electrode and ground. The location of the finger can be determined from the locations of one or more electrodes at which an increased capacitance is detected.

The induced current signal 227 is rectified by demodulation circuit 216. The rectified current output by demodulation circuit 216 can then be filtered and converted to a digital code by ADC 217.

The digital code is converted to touch coordinates indicating a position of an input on touch sensor array 121 by touch coordinate converter 218. The touch coordinates are transmitted as an input signal to the processing logic 102. In one embodiment, the input signal is received at an input to the processing logic 102. In one embodiment, the input may be configured to receive capacitance measurements indicating a plurality of row coordinates and a plurality of column coordinates. Alternatively, the input may be configured to receive row coordinates and column coordinates.

In one embodiment, a system for tracking locations of contacts on a touch-sensing surface may determine a force magnitude for each of the contacts based on the capacitance measurements from the capacitive sensor array. In one embodiment, a capacitive touch-sensing system that is also capable of determining a magnitude of force applied to each of a plurality of contacts at a touch-sensing surface may be constructed from flexible materials, such as PMMA, and may have no shield between the capacitive sensor array and an LCD display panel. In such an embodiment, changes in capacitances of sensor elements may be caused by the displacement of the sensor elements closer to a VCOM plane of the LCD display panel.

In an embodiment, fully digitally implemented portions of the capacitance sensor of FIGS. 1 and 2 may be implemented using programmable universal digital blocks (UDBs). As used herein, UDBs are a collection of uncommitted logic (PLD) and structural logic (Datapath) optimized to create all common embedded peripherals and customized functionality that are application or design specific. UDBs may be employed to implement a variety of general and specific digital logic devices including, but not limited to, field programmable gate arrays (FPGA), programmable array logic (PAL), complex programmable logic devices (CPLD) etc., to be described below. UDBs may be to perform various digital functions alone or in combination with other UDBs. Further, UDBs may be partitioned and their resources shared to optimized mapping of digital functions onto an array of UDBs.

Figure 3:
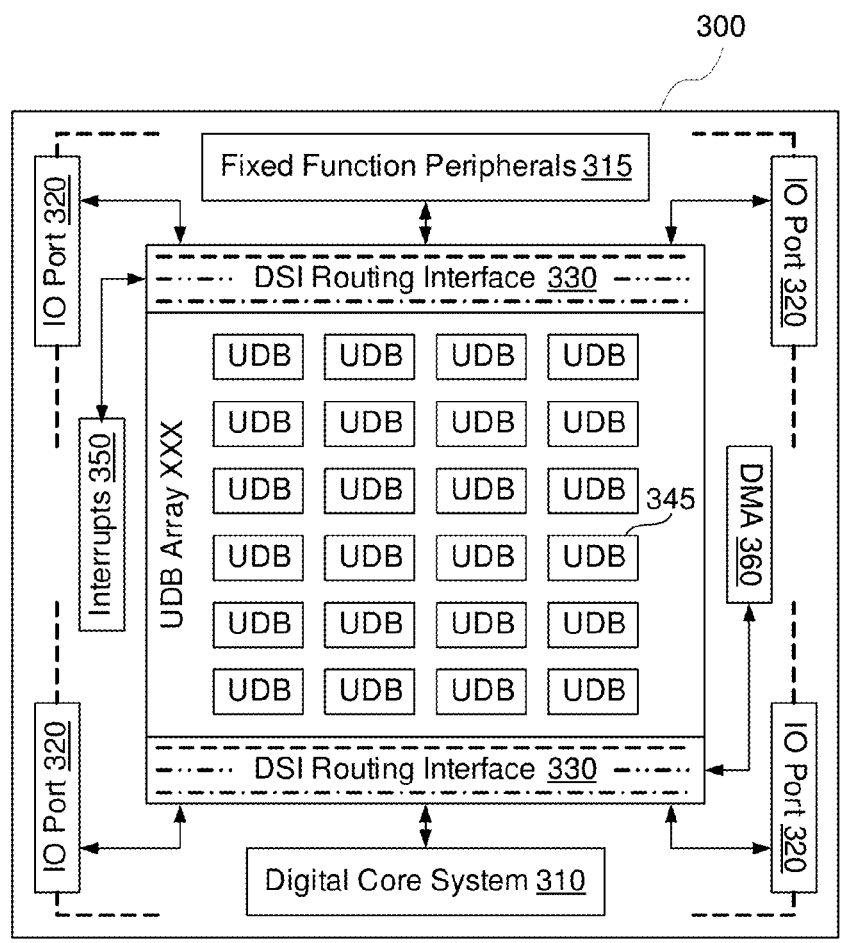
FIG. 3 illustrates one embodiment of digital subsystem that employs UDBs.

FIG. 3 illustrates one embodiment 300 of digital subsystem 300 that employs UDBs. The digital subsystem 300 may be configurable to perform digital signal processing functions including, but not limited to, pulse-width modulators, timers, counters, I2C communication, SPI communication, UART communication, cyclical redundancy checks, pseudo-random sequence generators, digital LCD drivers, state machines, digital multiplexers and sequencers, decimators, shift registers, as well as combinations of logic gates, and other suitable types of digital signal processing functions. Mixed-signal operations enabled by the digital subsystem 300 may include, but are not limited to, analog-to-digital converters, digital-to-analog converters, mixers, modulators and demodulators when coupled to the elements of the analog subsystem (e.g., 120, FIG. 1). The digital subsystem 300 includes highly-configurable universal digital blocks 345.

Digital subsystem 300 may include, for example, a plurality of digital core system elements 310, such as clock dividers and memory and the like, fixed function peripherals 315 and IO ports 320, each of which may be coupled to a digital routing fabric (e.g., digital system interconnect (DSI) routing interface) 330. DSI routing interface 330 may be coupled to UDB array 340, which may include a plurality of UDBs 345. UDBs 345, fixed function peripherals 315, IO ports 320, interrupts 350, DMA 360 and digital core system elements 310 may be coupled to the DSI routing interface 330 to implement full-featured device connectivity. In one embodiment, UDBs 345 may be a collection of, for example, uncommitted logic (PLD) and structural logic optimized to create common embedded peripherals and customized functionality that are application- or design-specific. In one embodiment, UDBs 345 may be arranged in a matrix with a homogenous structure to allow flexible mapping of digital functions onto the UDB array 340. The USB array 340 may support extensive and flexible routing interconnects between UDBs 345 and DSI routing interface 330.

In another embodiment, UDBs 345 may be implemented using CPLD or FPGA elements singly, together, or in combination with, for example, configurable or fixed-function logic elements, memories and/or look-up tables (LUTs).

Figure 4:
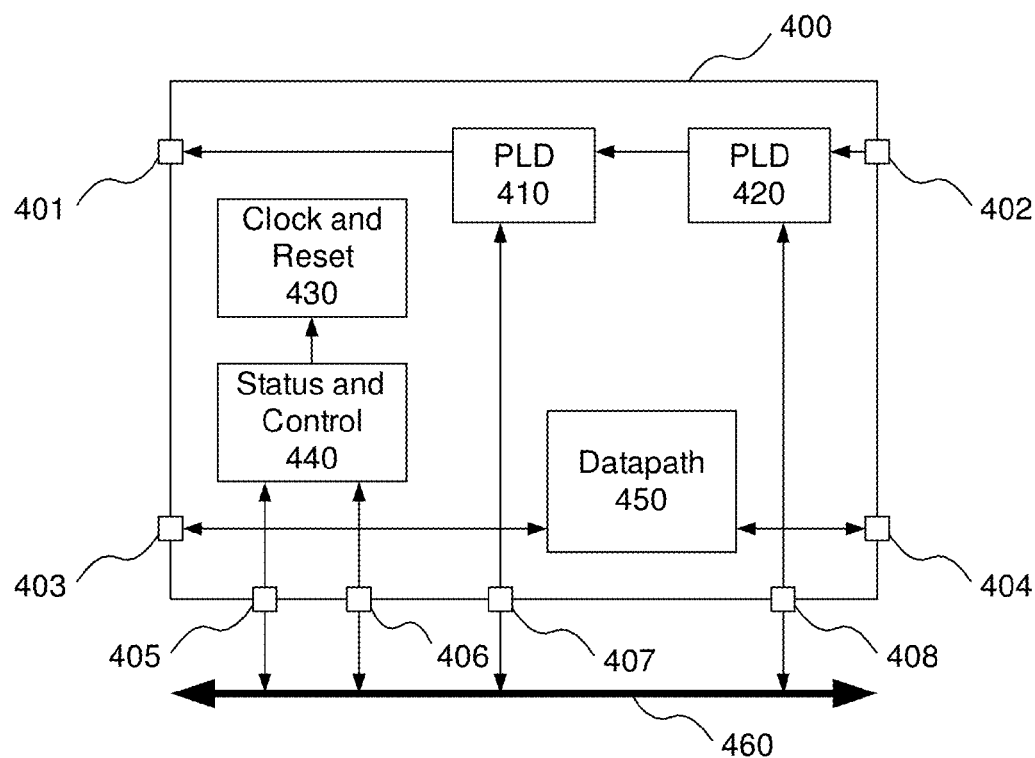
FIG. 4 illustrates one embodiment of a UDB, for example, as found in FIG. 3.

FIG. 4 illustrates one embodiment of a UDB 400, for example, as found in FIG. 3 (245). UDBs may be configured to perform digital functions alone or in combination with other UDBs by using a highly-configurable interconnect and chaining structure which allows UDBs to share unused resources with other groups of UDBs.

UDB 400 may include, for example, a first programmable logic device (PLD) 410 coupled to PLD chaining IO 401, routing channel 460 (e.g., via routing IO 407), and a second PLD 420. Second PLD 420 may be coupled to PLD chaining IO 402, first PLD 410, and routing channel 460 (e.g., via routing IO 408). UDB 400 may also include a clock and reset control block 430, which may be coupled to a status and control block 440. Status and control block 440 may be coupled to routing channel 460 through, for example, routing IOs 405 and 406. UDB 400 may also include a datapath module 450, which may be coupled to datapath modules of other UDBs through datapath chaining IOs 403 and 404. First and second PLDs 410 and 420 may take inputs from the routing channel 460 and form registered or combinational sum-of-products logic and may be used to implement state machines, state bits, combinational logic equations, and the like. In some embodiments, PLD configurations may be automatically generated from graphical primitives, where functions may be mapped to the PLD and the PLD may be configured based on the settings of those functions. In some embodiments, datapath module 450 may be, for example, a datapath containing structured logic to implement a dynamically configurable arithmetic logic unit (ALU) and a variety of compare configurations of conditions. The datapath module 450 may also contain input/output FIFOs to serve as the parallel data interface between a processing core (not shown) and the UDB 400. The status and control block 440 may be used by the UDB 400 to interact with and synchronize to the processing core.

Figure 5:
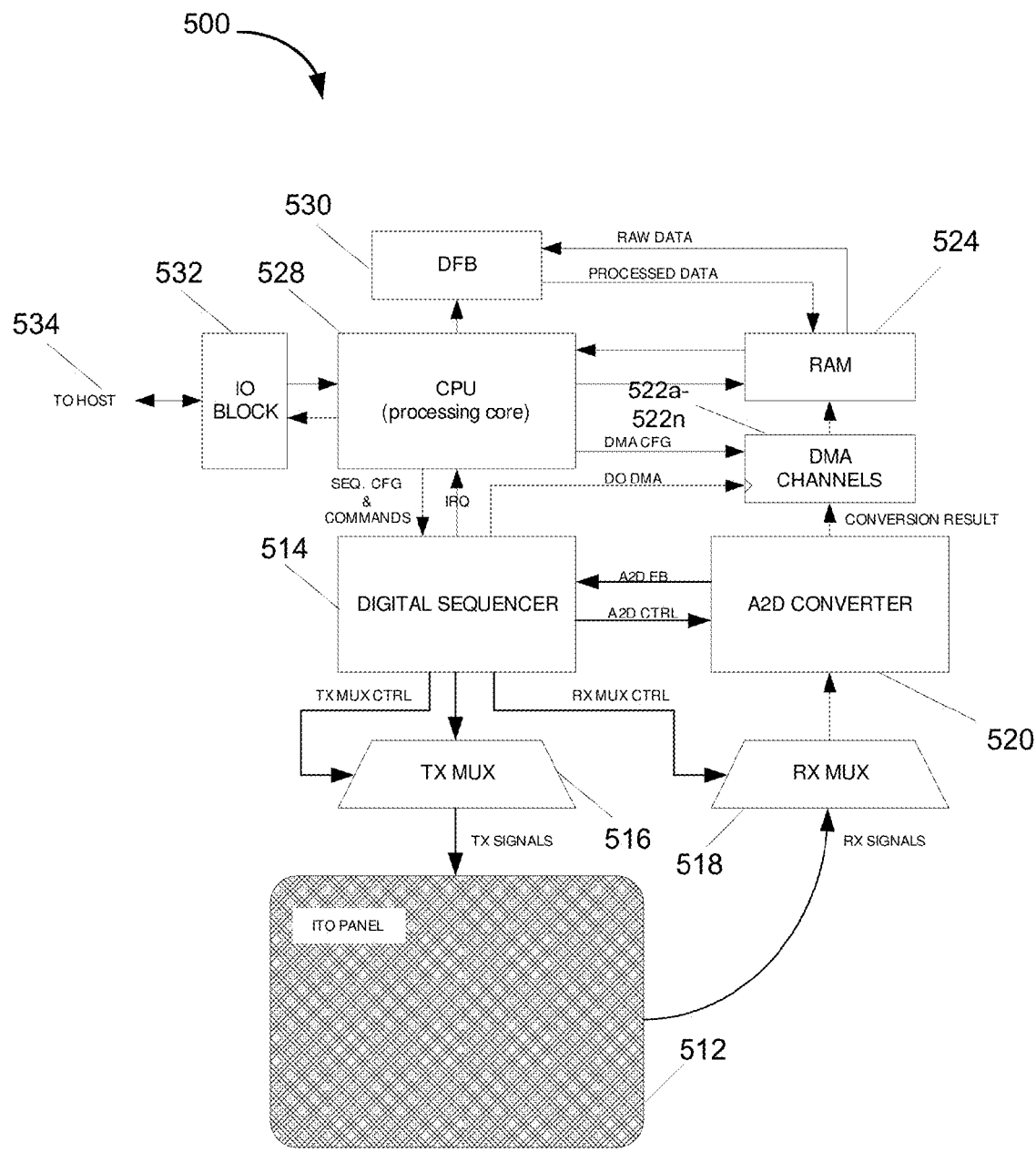
FIG. 5 depicts a block diagram of one embodiment of a system for detecting a response signal of a touch sense array that includes one embodiment of a programmable sequencer.

FIG. 5 depicts a block diagram of one embodiment of a touch sense controller 500 for detecting a response signal of a touch sense array 512 that includes one embodiment of the capacitance sensor 101 and the processing logic 102 of FIG. 1. The capacitance sensor 101 includes a digital sequencer 514, transmitting signal multiplexer 516, a receiving signal multiplexer 518, and an analog-to-digital (A2D) converter 520. Processing logic 102 include direct memory access (DMA) channels 522a-522n, random access memory (RAM) 524, a processing core 528 and/or an optional digital filter block (DFB) 530, and I/O blocks 532. In one embodiment, at least the digital sequencer 514, the transmitting signal multiplexer 516, and the DFB 530 may be implemented using UDBs. A specific implementation of the digital sequencer 514 implemented using UDBs is described below.

Returning to FIG. 5, the transmitting signal multiplexer 516 configured to transmit one or more stimulus (TX) signals generated by the programmable sequencer 514 to the touch sense array 512 (e.g., an ITO panel). The programmable sequencer 514 is configured to control the number of active TX transmission channels as well as the order of application of the one or more stimulus signals within the transmitting signal multiplexer 516. The receiving signal multiplexer 518 is configured to select each of the RX lines to be measured from the touch sense array 512 by the analog-to-digital (A2D) converter 520. The receiving signal multiplexer 518 and the A2D 520 may be controlled and configured by the programmable sequencer 514. Optionally, conversion results from the A2D 520 may be placed into individual direct memory access (DMA) channels 522a-522n of the random access memory (RAM) 524 under the control of the programmable sequencer 514. The conversion results may be processed by the processing core 528 and/or the optional digital filter block (DFB) 530. The processing core 528 and/or the DFB 530 may filter and process the conversion results to generate a touch map that is then stored back in the RAM 524. The touch map may be requested and/or directly sent via the I/0 blocks 532 to a host system 534.

In an embodiment, the programmable sequencer 514 may be configured by the processing core 528 at run time to be adapted to different configurations of the above-described components that may themselves have varying characteristics from manufacturer to manufacturer of touch screen panels. More particularly, the design of and internal routing of the programmable sequencer 514 may be programmed by the processing core 528 "on-the-fly" using programmable logic elements in the form of universal digital blocks (UDBs). In one embodiment, internal sub-blocks of the programmable sequencer 514 may be implemented as reconfigurable state machines to be described below. The programmable sequencer 514 may be implemented in such a way as to apply TX signals and perform full panel RX response signal scanning entirely without processing core interaction. The processing core 528 need only be notified via an interrupt when a panel scan is completed.

In one embodiment of operation, the processing core 528 configures the programmable sequencer 514 during system boot time according to properties of a particular touch sense array 512. To begin measurements, the processing core 528 sends a command to the programmable sequencer 514 to start scanning (e.g., with a start-of-scan (SOS) signal). In response, the programmable sequencer 514 performs scanning of the touch sense array 512. During scanning, the processing core 528 is not interrupted and may execute other processing tasks. After each raw data conversion, the programmable sequencer 514 may trigger the corresponding DMA channels 522a-522n to transfer results (i.e., the raw data) of the conversion to defined places in RAM 524. The A2D 520, under the control of the programmable sequencer 514, may be configured to calculate values proportional to mutual capacitances of all TX-RX intersections. At the end of a scanning interval, an entire frame of mutual capacitance measurements is provided to either the processing core 528 or the DFB 530 for generating a touch map. On completion of scanning, the programmable sequencer 514 may send an end-of-scan (EOS) interrupt to the processing core 528. The programmable sequencer 514 then waits for an SOS command from the processing core 528 to perform a next full panel scan. In an embodiment, the processing core 528 may reconfigure the programmable sequencer 514 on a subsequent full panel scan if it is expected to obtain better system performance with different settings. Thus, the architecture of the programmable sequencer 514 permits adaptive scanning algorithms.

Figure 6:
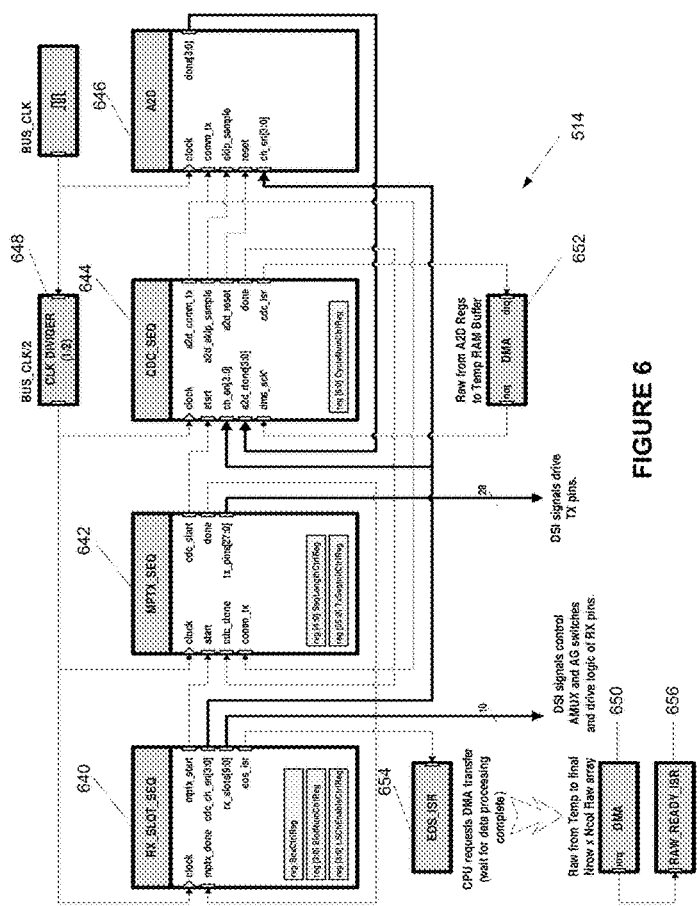
FIG. 6 depicts one embodiment of an implementation of the programmable sequencer of FIG. 5.
Figure 7B:
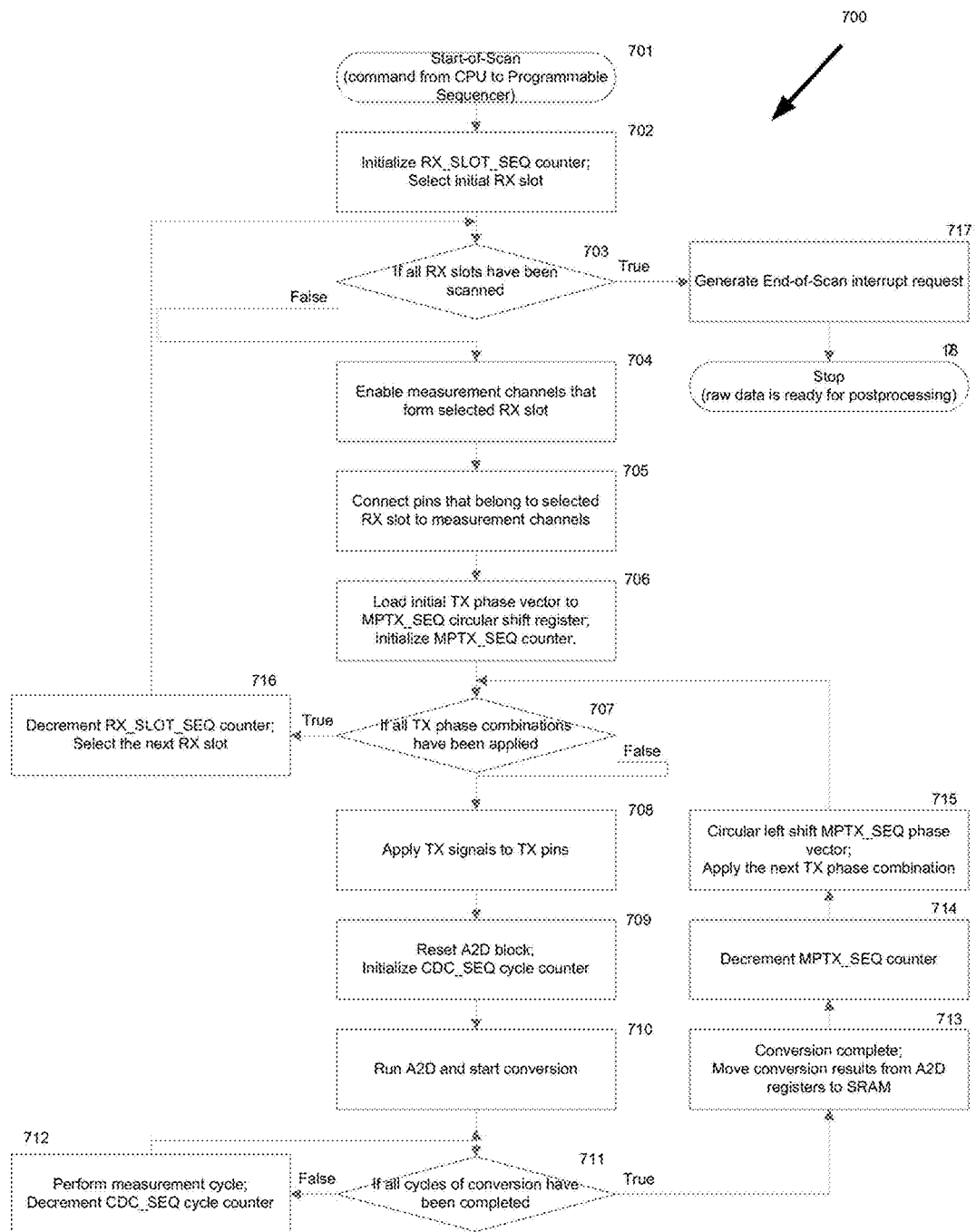
FIG. 7B shows a process flow corresponding to the pseudo-code listing of FIG. 7A.

FIG. 6 depicts one embodiment of an implementation of the programmable sequencer 514. FIG. 7A shows a pseudo-code listing that describes the sequence of operations performed by the programmable sequencer 514 of FIG. 5. FIG. 7B shows a process flow corresponding to the pseudo-code listing of FIG. 7A (to be described below). Referring now to FIGS. 6 and 7B, the programmable sequencer 514 may include at least three functional blocks (modules) RX_SLOT_SEQ 640, MPTX_SEQ 642 and CDC_SEQ 644, respectively, whose functional behavior is described in the execution of three nested loops of the pseudocode (lines 2, 11, 25) of FIG. 7A (and the flow diagram of FIG. 7B). A fourth block, A2D block 646 (not part of the programmable sequencer 14 proper), may be controlled by the other three blocks 640, 642, 644 to perform capacitance-to-code conversion. The first three blocks 640, 642, 644 may be clocked by a low frequency clock by means of a clock divider 648 (e.g., BUS_CLK/2). A high frequency clock (e.g., BUS_CLK) feeds the A2D block 646. The programmable sequencer 514 may also include two DMA components 650, 652 and two interrupt service request (ISR) components 654, 656 used for data transfer and interface to a CPU-controlled processing thread. Alternatively, the programmable sequencer 514 may employ other types of sequencer blocks as would be appreciated by one of ordinary skill in the art having the benefit of this disclosure.

The RX_SLOT_SEQ block 640 is an RX slots control sequencer 640 implemented in digital logic. An individual RX slot may be defined as a receiving a measurement channel corresponding to a combination of RX-electrodes of the touch sense array 512. The entire panel of RX slots may be scanned in parallel into an array of RX measurement channels. The RX slots control sequencer 640 may include, but is not limited to, the following functions that correspond to the "RX slots loop" at line 02 of the pseudocode of FIG. 7A:

(1) According to a programmed sequence, the RX slots control sequencer 640 may be configured to enable/disable RX-electrodes (i.e., connects/disconnects RX-electrodes to RX measurement channels) by generating high/low levels on terminals of the analog switches that form the RX receiving signal multiplexer 518. The slots control sequencer 640 enables/disables one slot at a time.

(2) According to a programmed sequence, the RX slots control sequencer 640 may be configured to enable/disable RX measurement channels that may or may not take part in a given conversion. For example, it may be desirable to measure even channels followed by odd channels.

(3) The RX slots control sequencer 640 may inform the processing core 528 that a scan of whole frame has been completed by generating a pulse on a terminal of the interrupt component 654 (i.e., EOS_ISR corresponding to sending an end-of-scan (EOS) interrupt.

(4) The RX slots control sequencer 640 may provide an interface for CPU commands and run-time reconfiguration (e.g. the start-of-scan (SOS) command).

(4) The RX slots control sequencer 640 may instantiate a handshaking interface to provide synchronization with other programmable sequencer modules.

The RX slots control sequencer 640 may instantiate the following control registers:

(1) reg SosCtrlReg—writing to this register may start panel scanning of the touch sense array 512.

(2) reg [3:0] SlotNumCtrlReg—represents the number of RX slots. In one embodiment, the maximum number of supported RX slots is 10.

(3) reg [3:0] LSChEnableCtrlReg—a bit-mask corresponding to measurement channels that are to be enabled in the last RX slot(s).

As shown in FIG. 6, in an embodiment, the RX slots control sequencer 640 may have the following input lines:

(1) clock—The RX slots control sequencer 640 (RX_SLOT_SEQ) block operation is synchronized with this clock.

(2) mptx_done—A pulse on this terminal indicates that the MPTX_SEQ block 642 has completed its tasks (i.e., all multiphase combination measurement are completed).

As shown in FIG. 6, in an embodiment, the RX slots control sequencer 640 may have the following output lines:

(1) mptx_start—A pulse on this terminal starts the MPTX_SEQ block 642.

(2) cdc_ch_en[3:0]—This is a bit-mask representing the sensing channels that are enabled for the current RX slots loop.

(3) rx_slots[9:0]—The control signals that define the states of analog switches which form the RX receiving signal multiplexer 518.

(4) eos_isr—Generates a pulse (IRQ) when a touch sense array panel scan has completed.

Figure 8:
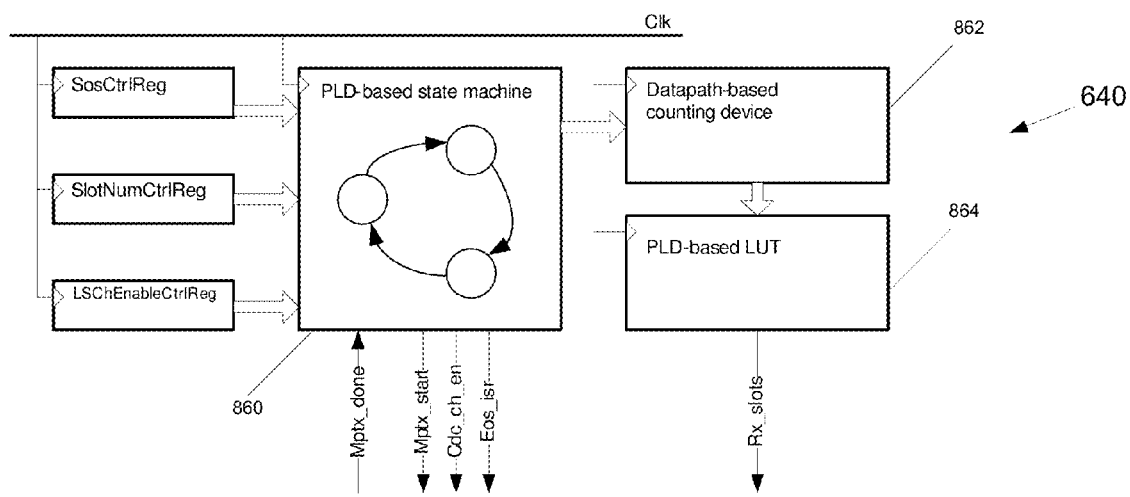
FIG. 8 shows a block diagram of one embodiment of an implementation of an RX slots control sequencer.

FIG. 8 shows a block diagram of one embodiment of an implementation of an RX slots control sequencer 640. The RX slots control sequencer 640 may include a PLD-based programmable state machine 860 configurable by the processing core 528. The programmable state machine 860 is configured to generate the state of a datapath-based counting device 862 and controls the inputs and outputs mentioned above. The PLD-based lookup table (LUT) block 864 and the counting device 862 select an RX slot for the current conversion. In one embodiment, scanning order may be up-down-counted (i.e., if the number of slots is 5, the order of measuring slots signals may be as follows: slot#4-slot#0-slot#3-slot#1-slot#2).

The RX slots control sequencer 640 may have alternative architectures, implementations, functional elements, registers, inputs, and outputs, as would be appreciated by one of ordinary skill in the art having the benefit of this disclosure.

The MPTX_SEQ block 642 is a multiphase TX pins control sequencer 642 implemented in digital logic. The functions of the multiphase TX pins control sequencer 642 may include the following functions that correspond to the "TX sequence shifting loop" at line 11 of the pseudocode of FIG. 7A:

(1) According to programmed operation mode (single-TX or multiphase-TX), phase pattern, and common TX signal state (generated by CDC_SEQ 644), the TX pins control sequencer 642 is responsible for applying TX excitation signals to TX pins.

(2) The TX pins control sequencer 642 may be configured to provide an interface for CPU commands and run-time reconfiguration.

(3) The TX pins control sequencer 642 may be configured to instantiate a handshaking interface to provide synchronization with other programmable sequencer modules.

The TX pins control sequencer 642 may instantiate two control registers:

(1) reg [4:0] SeqLengthCtrlReg—This register represents the bit length of a multiphase TX sequence. In an embodiment, the maximum length is 28.

(2) reg [55:0] TxSeqInitCtrlReg—This is the initial TX phase combination which loads an internal shift register when the "start" input (to be described below) is toggled. All following combinations may be generated by a left circular shift operation.

As shown in FIG. 6, in an embodiment, the TX pins control sequencer 642 may have the following input lines:

(1) clock—Block synchronization input.

(2) start—This input is toggled by the RX slots control sequencer 640 (RX_SLOT_SEQ) which initiates operation of the TX pins control sequencer 642 (MPTX_SEQ).

(3) cdc_done—A pulse on this terminal indicates that the capacitance-to-code converter control sequencer 644 (CDC_SEQ) block has completed its tasks (i.e., all TX cycles measurements have been integrated).

(4) comm_tx—This is a TX signal which modulates signals on the tx_pins terminal. In multiphase-TX mode, this TX signal is fed to the inputs of XOR gates, the second inputs of which are fed by an internal shift register (i.e., a phase pattern). When in single-TX mode, AND gates are used.

As shown in FIG. 6, in an embodiment, the TX pins control sequencer 642 may have the following output lines:

(1) cdc_start—A pulse on this terminal starts the capacitance-to-code converter control sequencer 644 (CDC_SEQ) block.

(2) done—Generates a pulse when all multiphase combination measurements are completed.

(3) tx_pins [27:0]—TX pins drive signals.

Figure 9:
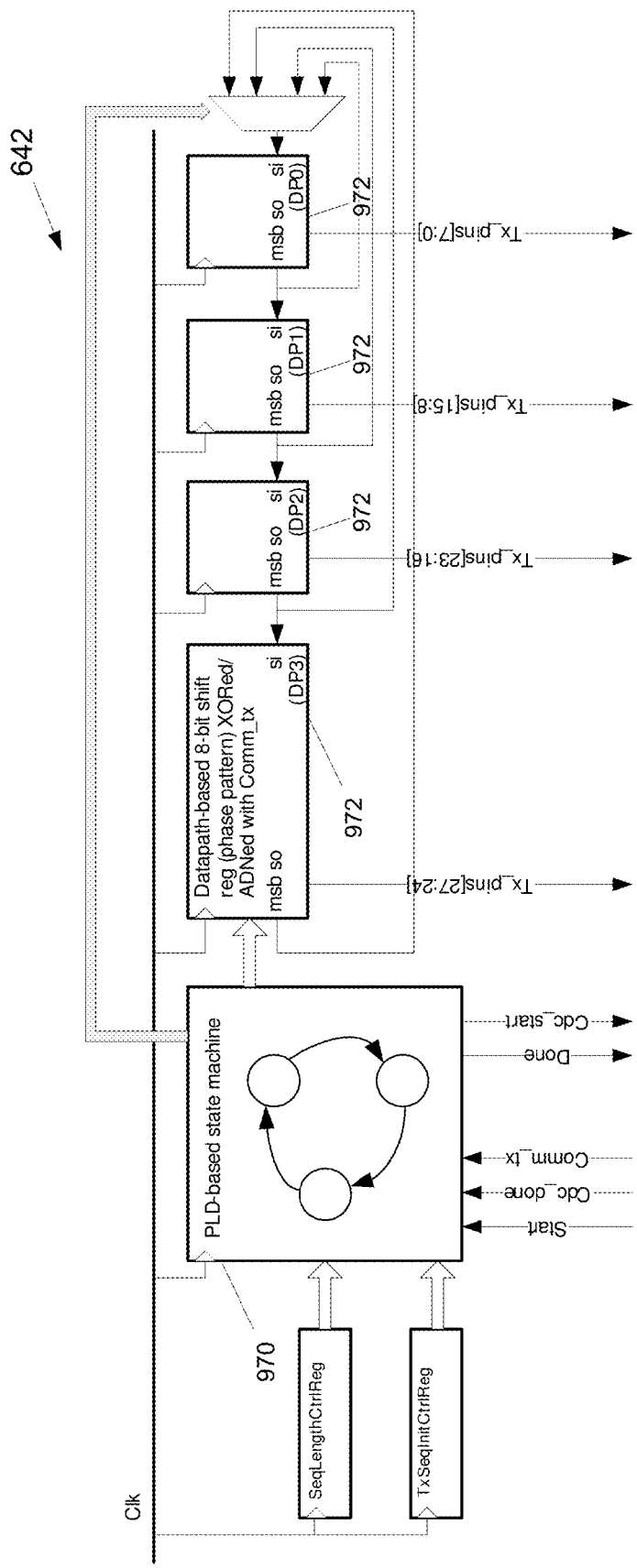
FIG. 9 shows a block diagram of one embodiment of an implementation of a TX pins control sequencer.

FIG. 9 shows a block diagram of one embodiment of an implementation of a TX pins control sequencer 642. The TX pins control sequencer 642 may include a PLD-based programmable state machine 970 configurable by the processing core 528. The programmable state machine 970 is configured to generate the state of four, 8-bit chained datapaths 972 and the controls inputs and outputs mentioned above. The datapathes 972 are employed as circular shift registers of arbitrary width (controlled by msb so bits and si mux state). These datapathes 972 also XOR/AND a phase pattern with the comm_tx signal.

The TX pins control sequencer 642 may have alternative architectures, implementations, functional elements, registers, inputs, and outputs, as would be appreciated by one of ordinary skill in the art having the benefit of this disclosure.

The CDC_SEQ block 644 is a capacitance-to-code converter control sequencer 644 implemented in digital logic. The functions of the capacitance-to-code converter control sequencer 644 may include the following and correspond to the "CDC sequence" at lines 14-30 of the pseudocode of FIG. 7A:

The capacitance-to-code converter control sequencer 644 may be configured to provide control of capacitance-to-code conversion in the A2D block 646 (e.g., conversion sequence control, synchronization of RX analog channels through a common TX signal, etc.).

The capacitance-to-code converter control sequencer 644 may be configured to provide an interface for CPU commands and run-time reconfiguration.

The capacitance-to-code converter control sequencer 644 may be configured to provide DMA transfer triggering for the results of each conversion.

The capacitance-to-code converter control sequencer 644 may be configured to instantiate a handshaking interface to provide synchronization with other programmable sequencer modules.

The capacitance-to-code converter control sequencer 644 may instantiate one control register:

reg [6:0] CycleNumCtrlReg—represents the number of TX cycles in an elementary scan (when the combination of TX phases is fixed).

As shown in FIG. 6, in an embodiment, the capacitance-to-code converter control sequencer 44 may have at least the following input lines:

clock—block synchronization input.

start—this input is toggled by TX pins control sequencer 642 (MPTX_SEQ block 642) which initiates operation of the capacitance-to-code converter control sequencer 644 (the CDC_SEQ block 644).

ch_en [3:0]—a bit-mask that represents which sensing channels are enabled for the current RX slots loop.

a2d_done [3:0]—a bit position indicates that the i-th channel has completed integration of charge injected by a single TX half period.

dma_ack—optional input. A pulse on this input line indicates that the DMA controlled raw counts transfer from A2D registers to temporary raw buffers has completed.

As shown in FIG. 6, in an embodiment, the capacitance-to-code converter control sequencer 644 may have the following output lines:

a2d_comm_tx—This terminal generates a common TX signal which modulates a multiphase sequence and is used in the A2D block 646.

a2d_skip_sample—When HIGH, this line indicates that an A2D integration is to be disabled for the current TX cycle (see line 22 of the pseudocode of FIG. 7A).

a2d_reset—This signal resets the A2D block 646.

Done—generates a pulse when charge integration for all TX cycles has completed and raw counts are transferred to a temp buffer.

cdc_isr—Generates a pulse (interrupt) for a DMA controller to transfer raw counts from the A2D block registers to a temp buffer.

Figure 10:
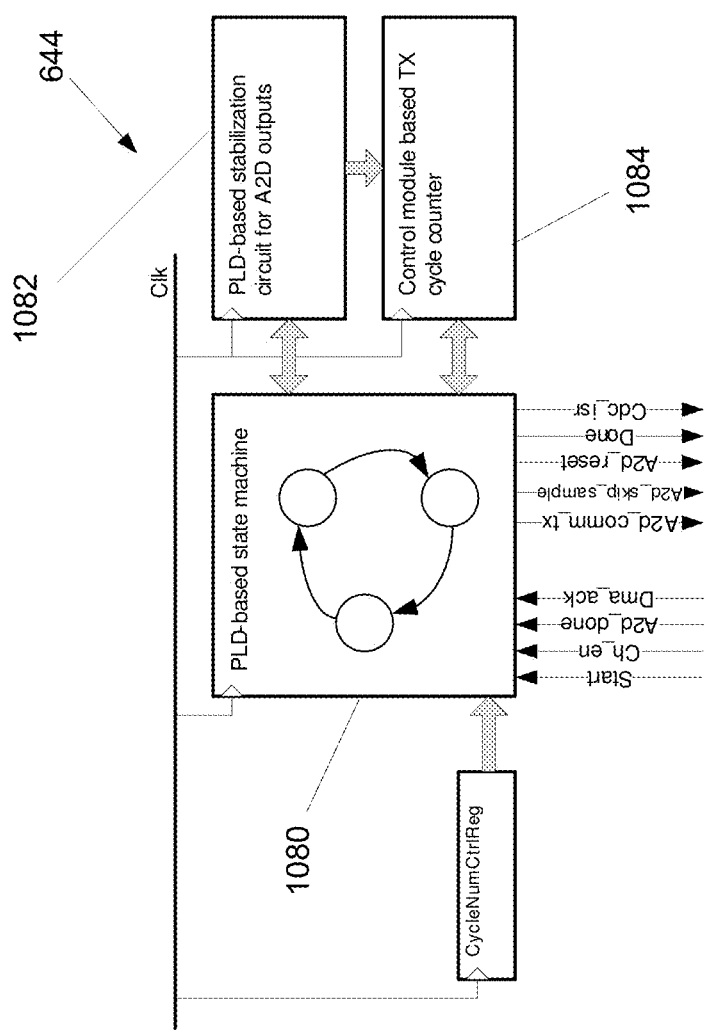
FIG. 10 shows a block diagram of one embodiment of an implementation of a capacitance-to-code converter control sequencer.

FIG. 10 shows a block diagram of one embodiment of an implementation of a capacitance-to-code converter control sequencer 644. The capacitance-to-code converter control sequencer 644 may include a PLD-based programmable state machine 1080 configurable by the processing core 528. The programmable state machine 1080 is configured to control the above-described inputs and outputs. A PLD-based stabilization circuit 1082 stabilizes A2D component outputs (outputs of comparators). A stabilization time interval is programmable. A separate counting device 1084 counts the number of TX cycles. The period value of this counter is programmable.

The capacitance-to-code converter control sequencer 644 may have alternative architectures, implementations, functional elements, registers, inputs, and outputs, as would be appreciated by one of ordinary skill in the art having the benefit of this disclosure.

The A2D block 646 is an analog-to-digital converter block implemented in mixed analog-digital circuitry. The A2D block 646 may include iDACs (programmable current sources), operational amplifiers, comparators, fixed-function timers, and auxiliary logic. The function of the A2D block 646 may be substantially that of an integrator. The A2D block 646 performs RX signal measurements in several modes selected by the programmable sequencer 514, e.g., mutual capacitance measurements, self-capacitance measurements, a hybrid sensing mode, a listener sensing mode, etc. A2D block 646 measures a value (time) proportional to a mutual capacitance created by a TX-RX intersection.

As shown in FIG. 6, in an embodiment, the A2D block 646 may have the following input lines:

clock—Block synchronization input. Note: clock frequency defines the system resolution.

comm_tx—TX signal of the system. Each edge of this signal excites the A2D block 646 from a stationary state. Then, the A2D block 646 relaxes back to a stationary state. The relaxation time is proportional to a mutual capacitance created by an TX-RX intersection.

skip_sample—When this lead is HIGH, it provides an indication that an A2D integration is to be disabled for the current TX cycle (see line 21 of the pseudocode of FIG. 7A).

reset—Resets the A2D block 646.

ch_en [3:0]—A bit-mask that represents which sensing channels are enabled for the current RX slots loop.

As shown in FIG. 6, in an embodiment, the A2D block 646 may have the following output lines:

done [3:0]—represents A2D comparators outputs.

The A2D block 646 may have alternative architectures, implementations, functional elements, registers, inputs, and outputs, as would be appreciated by one of ordinary skill in the art having the benefit of this disclosure.

As described above, a panel scan may begin after the SosCtrlReg is toggled by firmware. Substantially simultaneously, the processing core 528 is free to run a data processing thread. When a panel scan is completed, an end-of-scan interrupt service routine (EOS_ISR) may be generated.

Returning again to the process flow diagram of FIG. 7B, at block 701, the processing core 528 (e.g., of a CPU) initiate a scan by setting the Start-of-Scan bit in the corresponding register of the programmable sequencer 514. At block 702, the programmable sequencer 514 initializes the RX_SLOT_SEQ counter. The value in this counter represents the index of the currently scanned RX slot. At block 703, if all RX slots have been scanned, execution proceeds to block 717; otherwise, execution proceeds to block 704.

At block 704, the programmable sequencer 514 enables measurement channels that form the selected RX slot. At block 705, the programmable sequencer 514 connects the pins of the selected RX slot to inputs of the measurement channels. At block 706, the programmable sequencer 514 loads an initial TX phase vector (i.e., a multiphase pattern) to the MPTX_SEQ circular shift register. Also, the programmable sequencer 514 initializes the MPTX_SEQ counter. The value in this counter represents the index of currently applied TX phase combination. At block 708, if all TX phase combinations have been applied, execution proceeds to block 716; otherwise, execution proceeds to block 708.

At block 708, the programmable sequencer 514 applies TX signals to TX pins. At block 709, the programmable sequencer 514 resets the A2D block 646 and initializes the CDC_SEQ cycle counter. The value in this counter represents the index of the integration cycle in current conversion. At block 710, the programmable sequencer 514 runs the A2D block 646 and starts a conversion. At block 711, if all cycles of conversion have been completed, execution proceeds to block 713; otherwise, execution proceeds to block 712.

At block 712, the programmable sequencer 514 performs a measurement cycle and decrements the value in the CDC_SEQ counter. Execution returns to block 711. At block 713, a conversion is completed. The programmable sequencer 514 moves the conversion results from the A2D block 646 registers to SRAM. At block 714, the programmable sequencer 514 decrements the value in the MPTX_SEQ register. At block 715, the programmable sequencer 514 performs a circular left shift of the TX phase vector stored in the corresponding MPTX_SEQ register. The programmable sequencer 514 also applies the next TX phase combination. Execution proceeds back to step 707. At block 716, the programmable sequencer 514 decrements the value stored in the RX_SLOTS_SEQ counter and selects the next RX slot. Execution proceeds back to step 703. At block 717, the programmable sequencer 514 generates an End of Scan interrupt request to the processing core 528 (e.g., of the CPU). At block 718, data is ready for post-processing.

The programmable sequencer 514, the processing core 528, and the DFB 530 (collectively the "processing device") may reside on a common carrier substrate such as, for example, an integrated circuit ("IC") die substrate, a multi-chip module substrate, or the like. Alternatively, the components of processing device may be one or more separate integrated circuits and/or discrete components. In one exemplary embodiment, the processing device is the Programmable System on a Chip ("PSoC®") processing device, manufactured by Cypress Semiconductor Corporation, San Jose, Calif. Alternatively, the processing device may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It should also be noted that the embodiments described herein are not limited to having a configuration of the processing device coupled to a host, but may include a system that measures the capacitance on the touch sense array 512 and sends the raw data to a host computer where it is analyzed by an application program. In effect the processing that is done by the processing device may also be done in the host. The host may be a microprocessor, for example, as well as other types of processing devices as would be appreciated by one of ordinary skill in the art having the benefit of this disclosure.

The components of the system 100 may be integrated into the IC of the processing device, or alternatively, in a separate IC. Alternatively, descriptions of the system 100 may be generated and compiled for incorporation into other integrated circuits. For example, behavioral level code describing the system 100, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe the system 100.

It should be noted that the components of the system 100 may include all the components described above and more as would be appreciated by one of ordinary skill in the art having the benefit of this disclosure. Alternatively, the system 100 may include only some of the components described above as would be appreciated by one of ordinary skill in the art having the benefit of this disclosure.

In one embodiment, the system 100 is used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, a GPS device, or a control panel.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a computer-readable medium. These instructions may be used to program a general-purpose or special-purpose processor to perform the described operations. A computer-readable medium includes any mechanism for storing or transmitting information in a form (e.g., software, processing application) readable by a machine (e.g., a computer). The computer-readable storage medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory, or another type of medium suitable for storing electronic instructions. The computer-readable transmission medium includes, but is not limited to, electrical, optical, acoustical, or other form of propagated signal (e.g., carrier waves, infrared signals, digital signals, or the like), or another type of medium suitable for transmitting electronic instructions.

Additionally, some embodiments may be practiced in distributed computing environments where the computer-readable medium is stored on and/or executed by more than one computer system. In addition, the information transferred between computer systems may either be pulled or pushed across the transmission medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

Figure 11:
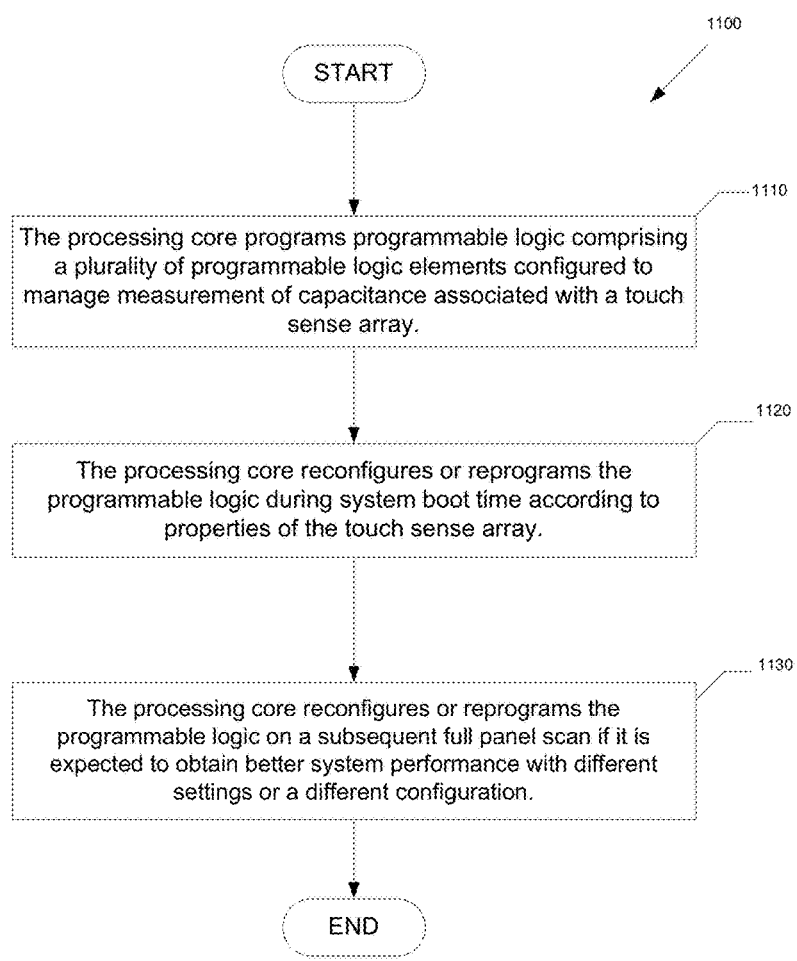
FIG. 11 is a process flow diagram of a method of run-time programming of the programmable sequencer of FIG. 5.

FIG. 11 is a process flow diagram 1100 of a method of run-time programming of programmable logic (e.g., the programmable sequencer 514) of FIG. 5. At block 1110, the processing core 528 may program programmable logic comprising a plurality of programmable logic elements configured to manage measurement of capacitance associated with a touch sense array 512. The programmable logic may be configured as the programmable sequencer 514 as a hardware-controlled scanning thread to scan the touch sense array 512 without interaction of a processing core 528 of the touch sense controller 500. At block 1120, the processing core 528 may reconfigure or reprogram the programmable logic during system boot time according to properties of the touch sense array 512. At block 1130, the processing core 528 may reconfigure or reprogram the programmable logic on a subsequent full panel scan if it is expected to obtain better system performance with different settings or a different configuration. Thus, the architecture of the programmable logic permits adaptive scanning algorithms.

In an embodiment, second thread is a hardware thread of a digital filter block (DFB) and is not part of a processing core of the processing device. In another embodiment, the second thread is a software thread of a processing core of the processing device.

Referring again to FIG. 4, the programmable logic devices (PLD) 410, 420 may be implemented as a field-programmable gate array (FPGA). An FPGA is an integrated circuit designed to be configured by a customer or designer after manufacturing—hence "field-programmable". The FPGA configuration is generally specified using a hardware description language (HDL), similar to that used for an application-specific integrated circuit (ASIC) (circuit diagrams were previously used to specify the configuration, as they were for ASICs, but this is increasingly rare). FPGAs can be used to implement any logical function that an ASIC could perform. The ability to update the functionality after shipping, partial re-configuration of the portion of the design and the low non-recurring engineering costs relative to an ASIC design (notwithstanding the generally higher unit cost), offer advantages for many applications.

FPGAs include programmable logic components called "logic blocks", and a hierarchy of reconfigurable interconnects that allow the blocks to be "wired together"—somewhat like many (changeable) logic gates that can be inter-wired in (many) different configurations. Logic blocks can be configured to perform complex combinational functions, or merely simple logic gates like AND and XOR. In most FPGAs, the logic blocks also include memory elements, which may be simple flip-flops or more complete blocks of memory.

Figure 12:
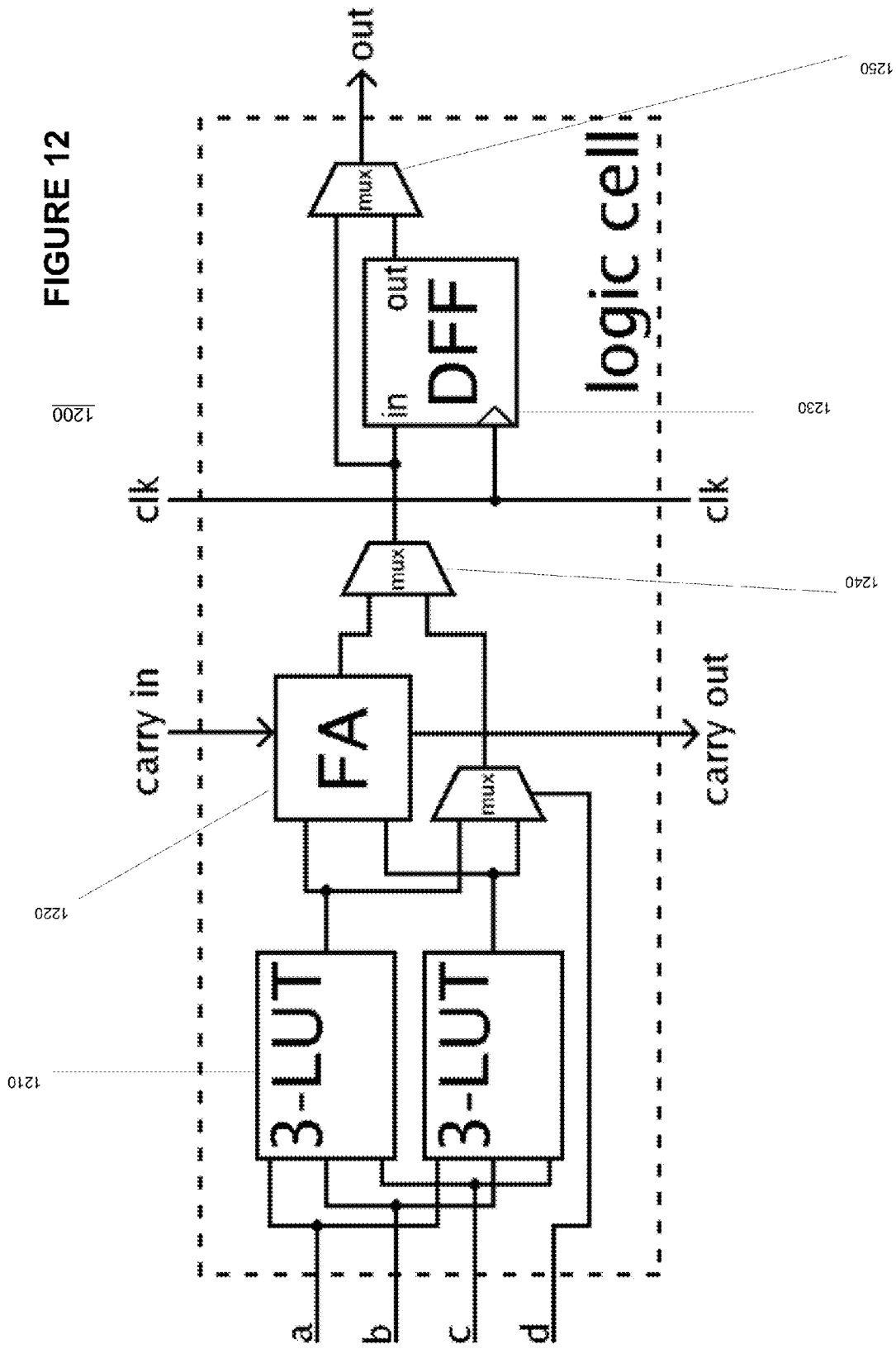
FIG. 12 is a block diagram of a logic cell of an FPGA.

FIG. 12 is a block diagram of a logic cell 1200 of an FPGA. In general, a logic block (CLB or LAB) include a few logical cells (called ALM, LE, Slice, etc.). A typical logic cell 1200 includes a 4-input Lookup table (LUT) 1210, a Full adder (FA) 1220 and a D-type flip-flop 1230. The LUTs 1210 are in this figure split into two 3-input LUTs 1210. In normal mode those are combined into a 4-input LUT through the left mux. In arithmetic mode, their outputs are fed to the FA 1220. The selection of mode is programmed into a middle multiplexer 1240. The output can be either synchronous or asynchronous, depending on the programming of the multiplexer 1250.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A circuit comprising
a touch sense controller configured to be coupled to a touch sense array, wherein the touch sense controller comprises:
programmable logic comprising a plurality of programmable logic elements configured to manage measurement of capacitance associated with the touch sense array, wherein the programmable logic is configured as a programmable sequencer that is a hardware-controlled scanning thread to scan the touch sense array without interaction of a processing core of the touch sense controller.

2. The circuit of claim 1, wherein the plurality of programmable logic elements comprises a plurality of universal digital logic blocks (UDB) of the touch sense controller.

3. The circuit of claim 1, wherein the programmable sequencer comprises a run-time reconfigurable state machine.

4. The circuit of claim 1, wherein the plurality of programmable logic elements comprises an RX slots control sequencer block configured to selectively enable or disable receiver (RX) measurement channels to take part in a conversion.

5. The circuit of claim 1, wherein the plurality of programmable logic elements comprises a transmit (TX) pins control sequencer block configured to apply TX excitation signals to TX pins.

6. The circuit of claim 5, wherein the TX pins control sequencer block is configured to apply one of single-TX and multiphase-TX excitation signals having a programmable phase pattern and common TX signal state.

7. The circuit of claim 1, wherein the plurality of programmable logic elements comprises an analog-to-digital converter control sequencer block configured to measure a value proportional to a mutual capacitance created by a TX-RX intersection.

8. The circuit of claim 1, wherein the programmable logic is configured to apply transmit (TX) signals on TX pins and receive (RX) signals on RX pins without interaction of the processing core of the touch sense controller.

9. The circuit of claim 1, wherein the programmable logic is reconfigurable during system boot time according to properties of the touch sense array.

10. A circuit comprising
a touch sense controller configured to be coupled to a touch sense array, wherein the touch sense controller comprises
programmable logic comprising a plurality of programmable logic elements configured to manage measurement of capacitance associated with the touch sense array, wherein the programmable logic is configured to apply transmit (TX) signals on TX pins and receive (RX) signals on RX pins without interaction of a processing core of the touch sense controller.

11. The circuit of claim 10, wherein the programmable logic is configured to notify the processing core when a full panel scan is completed via an interrupt.

12. The circuit of claim 10, wherein the programmable logic is configured to begin a full panel scan in response to a start-of-scan signal received from the processing core.

13. A circuit comprising
a touch sense controller configured to be coupled to a touch sense array, wherein the touch sense controller comprises
programmable logic comprising a plurality of programmable logic elements configured to manage measurement of capacitance associated with the touch sense array, wherein the programmable logic is reconfigurable during system boot time according to properties of the touch sense array.

14. A circuit comprising
a touch sense controller configured to be coupled to a touch sense array, wherein the touch sense controller comprises
programmable logic comprising a plurality of programmable logic elements configured to manage measurement of capacitance associated with the touch sense array, wherein the programmable logic is configured to perform an adaptive scanning algorithm.

15. A method, comprising:
programming programmable logic comprising a plurality of programmable logic elements configured to manage measurement of capacitance associated with a touch sense array; and
reconfiguring or reprogramming the programmable logic during system boot time or system run time according to properties of the touch sense array.

* * * * *